US008697786B2

(12) United States Patent
Chen

(10) Patent No.: US 8,697,786 B2
(45) Date of Patent: Apr. 15, 2014

(54) FLAME-RETARDANT COMPOUND, CONTINUOUS MATERIALS AND PRODUCTS CONSTRUCTED THEREFROM AND METHODS OF MANUFACTURE THEREOF

(75) Inventor: Ming-Ming Chen, West Chester, PA (US)

(73) Assignee: Federal Mogul Powertrain, Inc., Southfield, MI (US)

( * ) Notice: Subject to any disclaimer, the term of this patent is extended or adjusted under 35 U.S.C. 154(b) by 0 days.

(21) Appl. No.: 13/162,006

(22) Filed: Jun. 16, 2011

(65) Prior Publication Data
US 2011/0313085 A1    Dec. 22, 2011

Related U.S. Application Data

(60) Provisional application No. 61/355,331, filed on Jun. 16, 2010, provisional application No. 61/367,572, filed on Jul. 26, 2010.

(51) Int. Cl.
*C08K 5/34* (2006.01)
*C08K 5/3477* (2006.01)
*C08K 5/3435* (2006.01)

(52) U.S. Cl.
USPC ............................................ 524/101; 524/99

(58) Field of Classification Search
USPC ................................... 524/101, 99
See application file for complete search history.

(56) References Cited

U.S. PATENT DOCUMENTS

| | | | |
|---|---|---|---|
| 3,607,375 A | 9/1971 | Wiejak | |
| 3,632,402 A | 1/1972 | Weissermel et al. | |
| 3,705,859 A | 12/1972 | Boylan | |
| 3,981,839 A | 9/1976 | Asher et al. | |
| 4,007,247 A | 2/1977 | Ballard et al. | |
| 4,180,496 A | 12/1979 | Yanagimoto et al. | |
| 4,600,789 A * | 7/1986 | Sugerman et al. | 556/17 |
| 5,684,071 A | 11/1997 | Mogami et al. | |
| 6,166,114 A | 12/2000 | Cosstick et al. | |
| 6,207,735 B1 | 3/2001 | Kuma et al. | |
| 6,369,137 B2 | 4/2002 | Kersjes et al. | |
| 6,737,455 B2 | 5/2004 | Gosens et al. | |
| 6,828,365 B2 | 12/2004 | Martin | |
| 2002/0013392 A1 | 1/2002 | Matsuda et al. | |
| 2003/0022989 A1 | 1/2003 | Braig et al. | |
| 2003/0073763 A1 | 4/2003 | Govaerts et al. | |
| 2005/0137297 A1 | 6/2005 | DeWit | |
| 2005/0154099 A1 | 7/2005 | Kobayashi et al. | |
| 2005/0234161 A1 | 10/2005 | Steib et al. | |

(Continued)

FOREIGN PATENT DOCUMENTS

EP    0 164 227 A2    12/1985
WO   02057352         7/2002

*Primary Examiner* — Bijan Ahvazi
*Assistant Examiner* — Atnaf Admasu
(74) *Attorney, Agent, or Firm* — Robert L. Stearns; Dickinson Wright, PLLC

(57) ABSTRACT

A zero-halogen flame-retardant compound and continuous materials extruded therefrom comprise poly(ethylene terephthalate) (PET), fire-retardant ingredients melamine cyanurate (MC) and melamine polyphosphate (MPP), and an organo titanate coupling agent. The coupling agent acts as a dispersion agent to the fine powders of PET, MC and MPP and also allows the resin of the fine powders to be compounded at a reduced temperature which prevents degradation of the PET. The compound can be extruded as a thin film, sheet or tubing, and also as a filament or yarn, including monofilaments and multifilaments, which can ultimately be used to construct a protective sleeve.

15 Claims, 1 Drawing Sheet

(56) References Cited

U.S. PATENT DOCUMENTS

| | | |
|---|---|---|
| 2006/0217469 A1 | 9/2006 | Bauer et al. |
| 2007/0111010 A1 | 5/2007 | Kaprinidis |
| 2007/0299171 A1 | 12/2007 | Couillens et al. |
| 2008/0073629 A1 | 3/2008 | Chen |
| 2009/0234051 A1 | 9/2009 | Endtner et al. |

\* cited by examiner

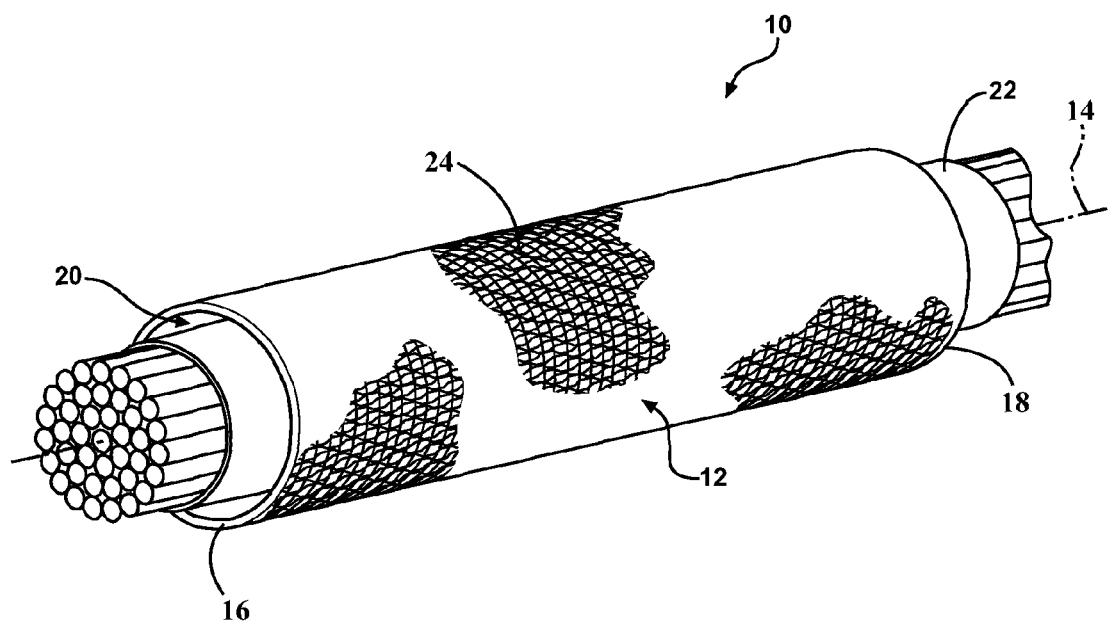

FLAME-RETARDANT COMPOUND, CONTINUOUS MATERIALS AND PRODUCTS CONSTRUCTED THEREFROM AND METHODS OF MANUFACTURE THEREOF

CROSS-REFERENCE TO RELATED APPLICATION

This application claims the benefit of U.S. Provisional Application Ser. No. 61/355,331, filed Jun. 16, 2010, and also the benefit of U.S. Provisional Application Ser. No. 61/367,572, filed Jul. 26, 2011, which are both incorporated herein by reference in their entirety.

BACKGROUND OF THE INVENTION

1. Technical Field

This invention relates generally to zero-halogen flame-retardant compounds, continuous materials and products formed therefrom and methods of manufacture thereof.

2. Related Art

It is known to manufacture materials from flame-retardant compounds such as fabrics from flame-retardant yarns, wherein the fabrics are used to protect items from exposure to flame. For example, it is known to construct braided, woven or knitted sleeves from fire-retardant yarns to protect elongate items, such as wires, contained within the sleeves. One known compound ingredient which has desirable fire-retardant properties is melamine cyanurate (MC).

The assignee herein is the assignee of U.S. Pat. No. 6,828,365, wherein MC is compounded with a fire-retardant polyphosphonate filler and a polymer selected from the group consisting of poly(ethylene terephthalate) and poly(ethylene naphthalate) and then extruded to form a fire-retardant monofilament. Since polyphosphonate is fire-retardant as well, it provides the resulting monofilament with additional fire-retardant properties. However, it does not teach using a fine particle size taught herein to enable thin or fine yarn filaments to be extruded from the compound.

Current commercially available halogen-free flame-retardant poly(ethylene terephthalate) (FR-PET) is made by adding an organo-phosphorous compound in the polycondensation stage of the PET polymerization process, such as in U.S. Pat. No. 4,086,208, which is incorporated herein by reference in its entirety. Unfortunately, products made with this phosphorus-containing PET (P-FR-PET) yarn or thin film do not meet the most stringent flame test requirements, such as prescribed by V0 requirements of the UL94 flammability test; FAR Parts 25.853 (a) and (b), designed by the US Federal Aviation Administration for aircraft interior compartment materials, and under UL VW-1 flame test.

The UL VW-1 flame test uses a flame with a total height of 100-125 mm and a blue inner cone 38 mm high and having a heat content of 8900 kcal/mm3 projected from a Tirrill burner (similar to a Bunsen burner), set at 20 degrees from vertical and secured to a wedge so that the tip of the blue cone touches the center of the front of the specimen. An indicator flag is positioned 254 mm above the tip of the blue cone and a layer of untreated surgical cotton of 6 to 25 mm thickness and 25 mm in diameter is placed on the wedge and around the base of the burner. The flame is applied for 15 seconds and removed. After an additional 15 seconds, or when the specimen ceases to flame whichever is longer, the flame is reapplied, wherein the process is repeated for a total of 5 applications. In order to pass the test, three conditions must be met. First, no more than 25% of the indicator flag shall be burnt or charred after any of the 5 flame applications. Second, the specimen shall not emit flaming or glowing particles or flaming drips at any time that ignite the cotton. Third, the specimen shall not continue to flame or glow longer than 60 seconds after any application of the flame. To date, the burn time and flame spread distance of the commercially available halogen-free flame-retardant poly(ethylene terephthalate) (FR-PET) are too long, and they are known to emit flaming drips, and thus, do not meet the aforementioned flame tests.

Further, it is known that complications arise when compounding PET, as it is easily degraded when exposed to heat, especially when moisture is present. Accordingly, known efforts to compound PET are typically met with failure due to the compounding temperature exceeding the temperature limits of the PET. In addition, as taught in U.S. Pat. Nos. 6,103,797 and 6,538,054, nitrogen-containing FR systems with melamine cyanurate have limited efficacy in thermoplastics, eg. polyamide. In reinforced polyamide, it is effective only in combination with shortened glass fibers. In polyesters, melamine cyanurate is not effective. Phosphorus-containing FR systems are generally not very effective in polyesters. Phosphorus/nitrogen-containing FR systems, eg. ammonium polyphosphates or melamine phosphates, have insufficient thermal stability for thermoplastics processed above 200.degree. C. JP-A 03/281 652 discloses polyalkylene terephthalates containing melamine cyanurate and glass fibers and also a phosphorus-containing flame retardant. The latter contains phosphoric acid derivatives, such as phosphoric acid esters (valence state +5), which when subjected to thermal stress cause transesterification of the polyester and degradation of the polymer matrix. These disadvantages are also apparent for the combination of melamine cyanurate with resorcinol bis(diphenylphosphate) disclosed in JP-A 05/070 671.

SUMMARY OF THE INVENTION

A zero-halogen flame-retardant compound comprises poly(ethylene terephthalate) (PET), fire-retardant ingredients melamine cyanurate (MC) and melamine polyphosphate (MPP), and an organo titanate coupling agent. The coupling agent not only acts as a dispersion agent to the fine powders of PET, MC and MPP, but it also allows the resin of the fine powders to be compounded at a reduced temperature which prevents degradation of the PET. The compound can be extruded as a thin film or sheet or tubing, and also as a filament or yarn, including monofilaments and multifilaments, which can ultimately be used to construct a protective sleeve.

Another aspect of the invention includes a method of forming a halogen-free flame-retardant compound for use in a compounding process. The method comprises: intensively mixing ingredients including dried fine powders of MC, MPP, PET and an organo titanate coupling agent. Then, introducing the ingredients into a twin screw extruder and compounding the ingredients to form a homogenous compound without degradating the PET. Further, subsequent or downstream extrusion processes can be used to extrude fire-retardant thin film or sheet, or yarn filaments, including monofilaments and multifilaments.

In accordance with yet another aspect of the invention, the MC, MPP and PET powders comprise below a 100 ppm combined moisture content.

In accordance with yet another aspect of the invention, the MC comprises 5 to 12 weight percent of the compound and the MPP comprises from about 5 to 12 weight percent of the compound.

In accordance with yet another aspect of the invention, the MC is provided having a particle size of about 2 µm, and the MPP is provided having a particle size of about 5 µm.

In accordance with yet another aspect of the invention, the organo titanate coupling agent is provided as neoalkoxy titanate from 0.1 to 1 weight percent.

In accordance with yet another aspect of the invention, a protective tubular textile sleeve constructed of yarn extruded from a zero-halogen flame-retardant compound is provided.

Accordingly, a zero-halogen flame-retardant compound in accordance with the invention has excellent flame-retardant properties, is useful in forming thin films, sheets, tubings and yarns for use in a variety of industries, including, but not limited to, automotive, aircraft, aerospace, railroad, marine, defense, protective clothing, home furnishings, upholsteries, mattresses and beddings, electronics, telecommunications and transportation, for example.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 1 is a perspective view of a textile protective sleeve constructed in accordance with one presently preferred embodiment of the invention.

DETAILED DESCRIPTION OF PRESENTLY PREFERRED EMBODIMENTS

A zero-halogen (containing no fluorine) flame-retardant compound in accordance with one presently preferred embodiment of the invention comprises PET, fire-retardant (FR) ingredients MC and MPP and an organo titanate coupling agent. The MC comprises from about 5 to 12 weight percent of the compound, the MPP comprises from about 5 to 12 weight percent of the compound, organo titanate coupling agent comprises from 0.1-1.0 weight percent, and the PET generally comprises the balance of the compound. It is contemplated that an additional stabilizer/antioxidant can comprise up to about 0.5 weight percent of the compound. The compound can be extruded in a subsequent or downstream extrusion process from the compounding process as a thin film or sheet, and also as a continuous filament or yarn, including monofilaments or multifilaments. When products made with this FR PET yarn are exposed to fire, the melamine compounds (MC and MPP) undergo endothermic decomposition where their temperature exceeds 320 degrees Celsius. The MC decomposes into melamine and cyanuric acid, while the MPP decomposes into melamine and phosphoric acid. Accordingly, given an endothermic reaction occurs, the decomposition process of the melamine compounds and subsequent endothermic sublimation of melamine absorb heat, thus, acts as a heat sink, cooling the combustion source. In addition, vaporized melamine releases inert nitrogen gas diluting oxygen and fuel gases present at the point of combustion. The released cyanuric acid from MC and released phosphoric acid from MPP coat and react with PET to form a layer of char that shield the condensed combustible polymer, which inhibits the propagation of flame. The vaporized melamine also acts as a blowing agent that blows up the char resulting in an intumescing effect. The ability of this FR system to effectively lower the temperature of the combustion source and form intumescent char also inhibits emitting flaming drips without the need to have "so called" anti-dripping agents including fluoro resin (fluorine containing resin). Further yet, aside from inhibiting flaming drips, the emission of potentially toxic and/or dark smoke resulting from burning material is inhibited. As such, the synergy between the MC and MPP in PET result in a material that meets the aforementioned flame test requirements.

A UL vertical wire flame test (VW-1) was performed on 10 mm, 13 mm and 19 mm braided sleeves, braided with filament extruded in accordance with the invention, wherein the filament was extruded as a 0.25 mm monofilament from halogen-free flame-retardant compound including PET, fire-retardant (FR) ingredients MC and MPP and an organo titanate coupling agent. The requirements to pass the test are as follows: the sample does not burn or glow for greater than 60 seconds after each of the five 15-second flame applications; the indicator tag is burned or charred greater than 25% after any of the 5 flame applications; and the sample does not emit flaming drips that ignite cotton on the floor of the test chamber. Ten samples of each the 10 mm, 13 mm and 19 mm sleeves were tested, and they all passed the aforementioned test requirements.

A thermal stability test was also performed on a filament extruded from a resin compounded in accordance with the invention, wherein the filament was extruded as a 0.25 mm monofilament from halogen-free flame-retardant compound consists of PET, fire-retardant (FR) ingredients MC and MPP and an organo titanate coupling agent. The monofilament was subjected to a 240-hour short-term heat aging test @150 degrees Celsius and @175 degrees Celsius, respectively. The percent retention of initial tensile strength for each of the tested filaments was 94% and 86%, respectively, wherein the requirement to pass the test was ≥50%. Further, a UL 125 degrees Celsius temperature rating test was performed over a 7-day heat aging timeframe @158 degrees Celsius and over a 60-day heat aging timeframe @134 degrees Celsius. The percent retention of initial tensile strength retained for each of the tested filaments was 90% and 87%, respectively, wherein the requirement to pass the test was ≥70%.

ASTM E662, a standard test method for specific optical density of smoke generated by solid materials was also performed on braided sample made with filament extruded from a zero-halogen resin compounded in accordance with the invention, wherein the zero-halogen resin was compounded from PET, fire-retardant (FR) ingredients MC and MPP and an organo titanate coupling agent. The test measurements are made of the attenuation of a light beam by smoke accumulating within a closed chamber due to non-flaming pyrolytic decomposition and flaming combustion. Results are expressed in terms of specific optical density which is derived from a geometrical factor and the measured optical density, a measurement characteristic of the concentration of smoke. In the non-flaming test, an electrically heated radiant energy source mounted within an insulated ceramic tube and positioned to produce an irradiance level of 2.2 Btu/s-ft$^2$(2.5 W/cm$^2$) averaged over the central 1.5" diameter area of a vertically mounted specimen facing the radiant heater. In the flaming combustion test, test specimen are exposed to a six-tube burner to apply a row of equidistant flamelets across the lower edge of the exposed specimen area and into the specimen holder trough. The application of flame in addition to the specified irradiance level from the heating element constitutes the flaming exposure. The following summarized the smoke density and toxicity test results obtained on a sleeving sample braided with filaments extruded from the inventive compound. The test results tabulated below show the product made from this inventive compound has low smoke and low toxicity.

| Smoke Density per ASTM E662 | |
|---|---|
| Smoke Density, max | |
| Non-Flaming Mode | 2 |
| Flaming Mode | 54 |

| Toxicity per Boeing BSS-7239 | | Toxicity per British Standard 6853 | |
|---|---|---|---|
| Toxic Gas | ppm | Toxic Gas | mg/g |
| CO | 180 | CO2 | 1555.06 |
| HF | <0.5 | CO | 48.98 |
| SO2 | <1 | HF | 0.00 |
| NOx | 20 | SO2 | 0.00 |
| HCN | 2 | HCN | 12.22 |
| HCl | <1 | HCl | 0.00 |
| | | Hbr | 0.00 |

In one presently preferred manufacturing process, the form in which the MC and MPP ingredients are introduced in the compounding stage is controlled. The MC is provided having a particle size of about 2 μm, and the MPP is provided having a particle size of about 5 μm. It is important to note that the particle size of the MC and MPP particles is critical in producing a compound that can be extruded to a textile filament. The smaller the particle size, the finer the filament can be extruded. As a rule of thumb, the diameter of FR additive particles should be less than 75% of the diameter of filament.

To facilitate dispersion of the MC and MPP fine powder, and to reduce or eliminate possible agglomeration, the MC and MPP fine powders are premixed with the PET powder. In one known embodiment, by way of example and without limitation, the PET powder is provided in a ratio of about 1:1 the combined amounts the MC and MPP fine powders. The particle size of the PET powder is preferably less than 100 μm, and more preferably less than 40 μm. By providing the PET in fine powder form, the MC and MPP have an increased carrier surface area upon which to attach, which in this case, is provided by the exposed surface area of the PET powder. To further reduce or eliminate possible agglomeration, the organo titanate coupling agent is added to the MC, MPP and PET mixed fine powders before compounding. One known organo titanate coupling agent found to facilitate dispersion of the ingredients is neoalkoxy titanate. In addition to facilitating dispersion and inhibiting agglomeration, the neoalkoxy titanate reduces the temperature required during compounding by about 10 degrees Celsius, which prevents the sublimation of melamine and inhibits degradation of the PET polymer material. It is important to keep all components (PET, MC, and MPP) as dry as possible, and compounded at as low the temperature as possible. With the presence of neoalkoxy titanate coupling agent, the compounding temperature has reduced by 10 degrees Celsius. As such, the degradation of PET during compounding is avoided.

In addition, it is critical that the moisture content of the ingredients be controlled as they are introduced in compounding stage. The total or combined moisture content of the MC, MPP and PET is generally controlled to be less than about 100 ppm, and more preferably to be less than about 50 ppm. The presence of moisture causes reverse-polymerization of PET in the extruder, thus breaking the PET polymer chain.

According to another aspect of the invention, a method of forming a halogen-free flame-retardant compound for use in an extrusion process is provided. The method includes providing fine powder ingredients of MC, MPP, PET, and an organo titanate coupling agent, and then, introducing the thoroughly premixed ingredients into an extruder with minimal air voids being present in the extruder such that the shear that can otherwise degrade the PET polymer being minimized. The use of the neoalkoxy titanate coupling agent has been shown to reduce the temperature required in typical compounding of PET by about 4-6%, which in turn results not only in an energy savings, but also greatly reduces the potential for the PET molecules to be scissored or broken. It is contemplated that the ingredients can be premixed, and then introduced into a hopper at the main throat of the twin screw extruder. It is also contemplated that PET pellet could be introduced at the main throat of the extruder via a hopper at the front end of the twin screw extruder, while the MC, MPP, PET powder and titanate coupling agent could be introduced downstream via a side feeder. Further yet, it is contemplated that the powder ingredients could be introduced at any zone of the extruder, as desired.

During compounding, it is believed preferable to maintain the temperature of the ingredients between about 245-260 degrees Celsius, which is about 4-6 percent below a typical compounding temperature for the constituent ingredients without inclusion of the organo titanate coupling agent. Thus, as discussed above, the possible degradation to the PET during compounding is minimized. Further, it is believed to be of benefit to utilize a screw configuration that imparts a minimal amount of shear on the polymer chains, while still being able to thoroughly mix all the ingredients to provide a homogenous compound. Upon compounding the ingredients, the compound can then be formed into pellets, for example, for subsequent extruding processes.

The compound pellets can then be used in a subsequent or downstream extrusion process to extrude fire-retardant thin film or sheet, tubing or continuous yarn filaments. The yarn filaments can be formed as either monofilaments or multifilaments, wherein the filaments are ultimately suitable for use in a variety of knitting, weaving or braiding processes, such as to form fabric for use as protective fire-retardant textile sleeves 10, for example, or other fire-retardant products, as desired. The sleeves 10 are constructed having a tubular wall 12 extending along a longitudinal central axis 14 between opposite ends 16, 18 to provide a central cavity 20 sized for receipt of an elongate member 22 to be protected, such as a wire harness or conduit, for example. The wall 12 is formed of interlaced yarn 24, i.e. woven, knit, braided, wherein at least some of the interlaced yarn 24 is provided as an "as extruded" continuous filament of the inventive compound, such as shown in FIG. 1. The filament yarns 24 can also be used in the various molding processes to build parts, for example. Regardless of the application, the end product constructed from the halogen-free (zero-halogen) flame-retardant compound in accordance with the invention meets the aforementioned flame test requirements.

Obviously, many modifications and variations of the present invention are possible in light of the above teachings. It is, therefore, to be understood that within the scope of the appended claims, and any other claims allowed which are related to this application, that the invention may be practiced otherwise than as specifically described.

What is claimed is:

1. A zero-halogen flame-retardant compound, consisting of:
    melamine cyanurate (MC);
    melamine polyphosphate (MPP);
    poly(ethylene terephthalate) (PET); and
    a titanate coupling agent.

2. The compound of claim 1, wherein said titanate coupling agent is neoalkoxy titanate.

3. The compound of claim 1, wherein said MC, MPP and PET comprise below a 100 ppm combined moisture content.

4. The compound of claim 1, wherein said MC comprises 5 to 12 weight percent of the compound and the MPP comprises from 5 to 12 weight percent of the compound.

5. The compound of claim 1, wherein said MC is provided having a particle size of about 2 μm, and the MPP is provided having a particle size of about 5 μm.

6. A method of forming a zero-halogen flame-retardant continuous material, consisting of the steps of:
    providing melamine cyanurate (MC);
    providing melamine polyphosphate (MPP);
    providing poly(ethylene terephthalate) (PET);
    providing a titanate coupling agent;
    forming a mixture of the melamine cyanurate, melamine polyphosphate, poly(ethylene terephthalate) and titanate coupling agent;
    compounding the mixture; and
    extruding the compounded mixture.

7. The method of claim 6, further including providing the titanate coupling agent as neoalkoxy titanate.

8. The method of claim 6, further including extruding a monofilament from the compound.

9. The method of claim 6, further including extruding the compound with the MC, MPP and PET having less than a 100 ppm combined moisture content.

10. The method of claim 6, further including providing the MC having 5 to 12 weight percent of the compound and the MPP having from 5 to 12 weight percent of the compound.

11. The method of claim 10, further including providing the titanate coupling agent having 0.1 to 1.0 weight percent of the compound.

12. The method of claim 6, further including providing the MC having a particle size of about 2 μm and the MPP having a particle size of about 5 μm.

13. The method of claim 6, further including providing the PET in a ratio of about 1:1 with the combined amounts of the MC and MPP.

14. The method of claim 6, further including maintaining the temperature of the mixture between about 245-260 degrees Celsius during compounding.

15. A fire-retardant protective textile sleeve, comprising:
    yarn interlaced to form a tubular wall; and
    at least some of said yarn being an as extruded monofilament consisting of:
      melamine cyanurate;
      melamine polyphosphate;
      poly(ethylene terephthalate); and
      a titanate coupling agent.

* * * * *